8594X
J. BURNS & J. WALTER.
Meat Mincer.
Patented Jan. 16, 1835
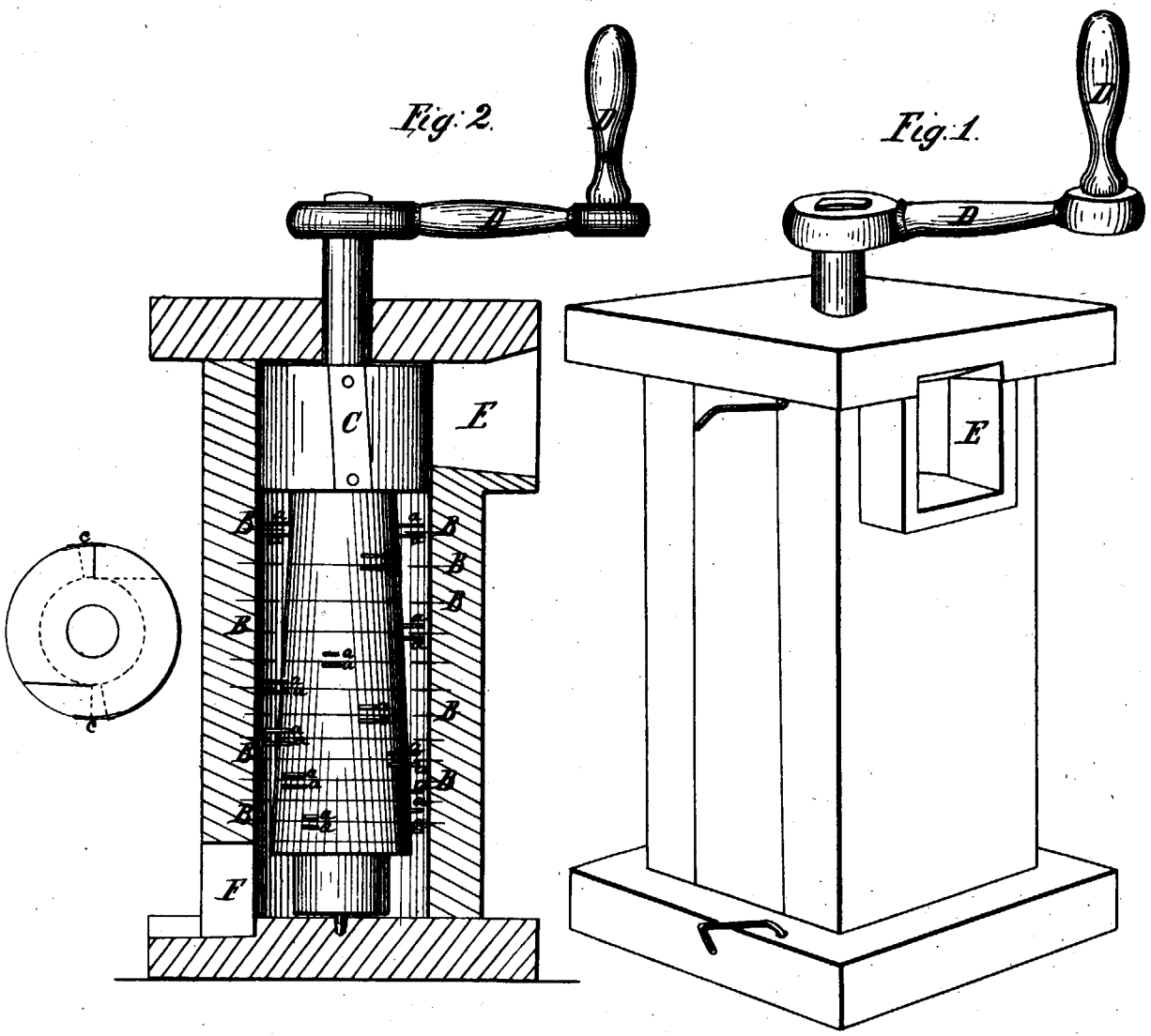
THE NORRIS PETERS CO., PHOTO-LITHO., WASHINGTON, D. C.

James Burns & John Walter, Waynesboro: Pa.

Letters Patent.

The Schedule referred to in these Letters Patent, and making part of the same, containing a description in the words of the said James Burns & John Walter, themselves, of their improvement in the Machine for mincing meat, or sausage Machine:

To all to whom these presents shall come.

Be it known that we James Burns, & John Walter of Waynesboro in the County of Franklin, and State of Pennsylvania, have invented a new and useful improvement in a Machine for mincing meat, or sausage Machine, and that the following is a full and exact description of the construction and operation of the said Machine as invented by us. The machine consists of a shoulded cone or cylinder, & a cylindrical concave, with stationary knives closed at both ends, together with a feeding hopper. The cone or cylinder is made solid, and may be made most conveniently of hard wood as follows. A cylinder being first formed of a diameter and length proportionable to the size of the machine to be constructed; a portion of its length, is, sufficient for the feeder hereafter described being reserved, the balance is turned down or diminished to the form of a frustum of a cone, the smaller end being next that part reserved for the feeder; In the reserved part of the cylinder two notches or grains are cut on opposite sides thereof, in such manner as to present alternately a square & an oblique shoulder, ie, forming the square shoulder by a cut parallel to the axis of the cylinder, in the direction of its diameter and another at right angles thereto — the oblique shoulder or side formed by the latter cut, being
flush or level with the surface of the cone above des=
cribed. It will also be found of advantage not to cut
these gains entirely out to the end of the cylinder, but to
have a portion of it standing of ½ an inch or more in width
to form a rim or flange to prevent the meat from passing over
to the journal of the cylinder, and thereby impeding its
motion. Two knives which we call feeding knives
made of steel, and of proper width and length are secured
on the surface of the still remaining portions of the original
cylinder, so as, to project a short distance over the square shoulders
of the gains. The surface of the conical frustum above
described, is to be armed, with spikes or studs (not to
project beyond the circumference of the original
cylinder) forming four or more equidistant rows
running spirally around it, and so spaced as to pass
clear, one between each of the fixed knives of the con=
cave hereafter described; We prefer these studs to be of a
square form, as better answering the purpose intended
Those next the feeder where the distance between the
knives is greater, are to be placed in pairs, each pair stand=
=ing on a line parallel to the axis of the cone, and only
leaving space sufficient between them for their correspond
=ing knife to pass freely; the object of this arrangement in
pairs & parallel position being, to lift the meat square and
carry it with more effect, against the knives. A portion
of the large end of the cone is turned down, or reduced
sufficiently to permit the meat to discharge through an opening
in the concave immediately under it, after passing the knives;
A small iron strap or scraper being fixed to the concave to prevent
the meat adhering to that end of the cone. The cylinder or cone
is furnished with Journals either of iron or the original wooden
Cylinder diminished to a proper size, one of which Journals
is is sufficiently prolonged to receive the crank or band
pulley by which it is revolved. The cylindrical concave
which is of a diameter sufficient to admit the original
cylinder without friction is made of six pieces, two side
and two end pieces, a top and a bottom piece. The bottom
sides, & top by their inner surfaces each forming one qua
=drant of the concave. we prefer that the timber be sufficient
=ly thick to allow of each piece being made out of the solid,
and leave a plane external surface so that when together
the external surface of the concave is of a parallelopiped
shape, the bottom and top is made to lap over the sides,
to which they are attached, by dowel or steady pins, and
the end pieces projecting an inch or more beyond the sides
top and bottom receive them into a deep rabbet, or also
into a suitable mortice, a tenon or any similar con=
trivance on the end of each piece so that when propa=
ly keyed, the pieces are all confined firmly together,
and at the same time admit of being easily taken
apart. The end pieces are also pierced in their centres
to receive the shaft or journals of the cone or cylin
=der, which may be supplied with suitable boxes
at the option of the constructor.

The fixed or stationary knives which are made of
thin straight plates of tempered steel brought to an edge
of a proper width, are let transversely and parallel
to each other into the side pieces (their edges forming
chords to the quarter circle of the side pieces) by ~~[illegible]~~
simply scoring them with a saw sufficiently thick
for that purpose and setting them into the grooves so
formed — the knives are also something longer
than the breadth of the side pieces so as to project on
one side — the projecting part thereof being inserted
into the top and bottom pieces of the concave, to wit, there those ends which first receive the pressure of the
meat above are inserted into the top, and vice versa,
beginning next the feeding end of the Machine, they are
spaced gradually nearer to each other as you approach the
discharging end, commencing with say 1½ inch and ending
with ¼ inch apart. The number of knives may be varied
at pleasure, we have found in a concave 17 inches long &
5½ inches diameter 12 knives of a side to answer sufficient-
ly well. Immediately opposite the feeding knives and
beginning at the top edge of the side piece, and wide as
the length of said knives, a groove or channel is cut in
the side piece, which descends obliquely towards the
stationary knives, at an angle of 31° more or less & extends
to the bottom of the concave— said groove being deep at the
commencement, and running out at the end; its use being
to receive the meat from the hopper and convey it to the bot-
tom of the concave towards the fixed knives, where it
is acted on by the studs. In the top piece & over the
feeding knives a square hole is cut of the width of the
feeding knives or channel which receives a shallow
hopper of the ordinary form except that, that edge of
the foot next the groove is bevelled under & forms
a continuation thereof. We find it convenient to
attach three sides of the hopper permanently to the
top piece of the concave and make the projection of the end
piece of the concave serve as the fourth side.

Operation.— The meat to be minced being cut & freed from
bones, as in the usual manner, is placed progressively
in the hopper, whilst the machine is in revolution by hand,
horse, or any other power. The feeding knives operate to
cut or draw it into the grains from which it is pressed by
the square shoulders through the feed channel under the
cone or cylinder, where it is met & taken up by the first
pair pair of studs & pressed alternately against the stationary knives on each side of the concave, by each operation being carried nearer to the discharging end of the machine until it is there discharged, finished for use. should a bone or other obstruction by inadvertence, enter the machine, it is only necessary to reverse its motion, and the contents are thrown back into the hopper, whence it can be removed without the delay of taking the machine apart. Now we do not claim as our own invention, the use of an armed revolving cone or cylinder in connec=tion with stationary parallel knives fixed in the concave for mincing meat — nor do we claim the use of station=ary knives — but what we do claim as our invention, and for which we ask Letters Patent — is the peculiar arrangement in spiral rows of the spikes or studs on on the cone or cylinder, as herein particularly described and the spacing of the knives regularly nearer to each other towards the discharging end of the machine. We also claim in connection therewith, the manner of feeding by means of the feeding knives & gains, and the deep oblique channel grooved out or sunk in the concave. Neither do we intend to confine ourselves to any number of knives, nor to any number of rows of knives, but to vary the concave, by constructing it of 6. 8, 10 or more sections or side pieces. with 3.4.5 or more rows of knives. Nor of the size or shape of the feeding knives & shoulder.

In testimony that the foregoing is a true speci-fication of our said improvement, we have hereunto set our hands this fifth day of January 1835.

Witnesses

G. W. Kidley
Robt. Clarke

James Burns
John Walker

Ex'd Ch...

1580 ?